Patented Feb. 4, 1930

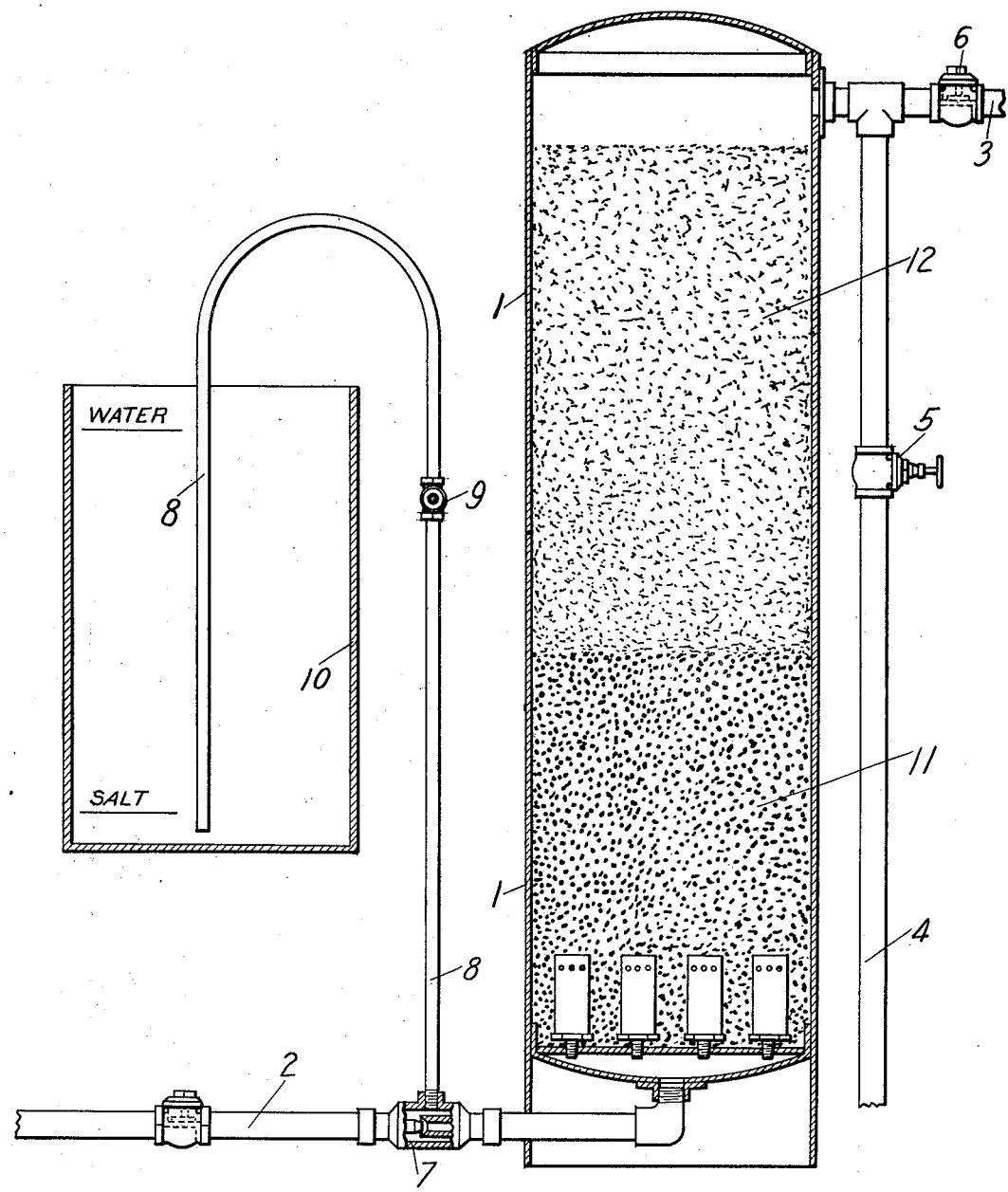

1,745,563

UNITED STATES PATENT OFFICE

EDWARD T. TURNER, OF DAYTON, OHIO

WATER SOFTENER

Application filed December 10, 1928. Serial No. 325,033.

This invention relates to water softeners and more particularly to a water softening medium for use in connection with a water softening apparatus. One type of water softening apparatus now extensively used employs as a water softening agent a material having the property of exchanging its natural or normal base for the substances which harden the water. When such a material is brought into contact with hard water it will give up its natural or normal base, usually potassium or sodium, in exchange for the substances which harden the water, such as calcium and magnesium, thereby removing these substances from the water and softening the water. This reaction or change of base continues until the softening material is so impregnated with the hardening substances taken from the hard water that it will no longer take up sufficient quantities of those substances to soften the water. It is then subjected to the action of a regenerating solution, such as a solution of sodium chloride or common salt, which displaces the hardening substances which have been taken up by the material and restores the normal sodium base of the softening material, thus reconditioning the same and rendering it capable of further use as a softening agent. Various materials are used for this purpose, the most common being zeolite, synthetic zeolite and glauconite, the latter being comonly known as "green sand". Each of these materials has certain desirable characteristics and certain undesirable characteristics. Synthetic zeolite has a very slow rate of base exchange but has the capacity of softening large quantities of water without reconditioning. Because of its low rate of base exchange water passed through the same at a normal rate of flow will not be completely softened.

Glauconite or green sand has a relatively rapid rate of base exchange and will soften only a comparatively small quantity of water before requiring reconditioning. Because of its high rate of base exchange it will completely soften water at a normal rate of flow, thus enabling water of zero softness to be obtained without restricting the flow at the faucets.

Hard water is usually introduced into the water softener through distributing heads having small discharge openings. Synthetic zeolite is of such a character that it has a tendency to clog these openings and thus restrict the delivery of water to the softener. Glauconite does not so clog the openings of the distributors. Further, glauconite is available at a much lower cost than is synthetic zeolite.

One object of the present invention is to provide a water softening medium which will completely soften the water, which will have a large softening capacity and which can be provided at a relatively low cost.

A further object of the invention is to provide a water softening medium which will utilize two water softening materials, having different rates of base exchange, in such a manner as to retain in a large measure the desirable characteristics of both materials and to eliminate, largely if not altogether, the undesirable characteristics of both materials.

Other objects of the invention will appear as it is described in detail.

The accompanying drawing is a sectional view of one form of a water softening apparatus showing my invention applied thereto.

The invention may be embodied in water softening apparatus of various kinds and I have here shown it in connection with a water softener of a well known type. This water softener comprises a container 1 for the water softening material having a hard water supply pipe 2 connected therewith near the bottom thereof. The container has at its upper end an outlet which is connected with a service pipe 3 and with a drain pipe 4. The drain pipe is provided with a valve 5 and the service pipe has a check valve 6 so arranged that when the drain valve is opened the back pressure in the service line will close the check valve. The regenerating solution is introduced into the container through the hard water supply pipe 2, which has therein an injector 7 with which a regenerating solution pipe 8 is connected, this pipe having a valve 9 to control the flow of liquid through the same. As here shown, this regenerating solution pipe is connected with a salt receptacle 10 and when the outlets from the container are closed the opening of the valve 9 will cause water to flow through the pipe 8 to the salt receptacle, thus generating the salt solution. When the drain valve is opened water will flow through the injector to the container and will thus draw the salt solution from the receptacle through the pipe 8 and into the container. When the desired quantity of salt solution has been delivered to the container the valve 9 is closed and fresh water flows through the container to wash out the salt, after which the drain valve is closed and the softening operation is restored.

In applying my invention to an apparatus such as that above described, which it will be noted is an upflow softener, I place in the bottom of the container a bed of glauconite, or green sand 11, the quantity being sufficient to completely soften the water which flows through the same at the normal rate of flow. Above the glauconite, and preferably resting directly thereon is a bed of synthetic zeolite 12, the depth of which may vary. While a relatively large quantity of synthetic zeolite will produce the most satisfactory results I have found that very good results may be secured with a bed of synthetic zeolite equal to or less than the depth of the bed of glauconite. Therefore, one of the controlling factors in determining the depth of the bed of synthetic zeolite is the price at which the device is to be sold. I prefer, however, that the bed of synthetic zeolite shall be at least of a depth equal to the depth of the bed of glauconite.

The water introduced into the container will pass up through the bed of glauconite and when this material is operating at full efficiency it will completely soften the water. As the exchange of base of the glauconite progresses the synthetic zeolite will give up a portion of its base to the partially exhausted glauconite, thereby reconditioning the glauconite and tending to maintain the two materials in substantially equal base condition, and thus enabling the same to completely soften very much larger quantities of water without reconditioning than the glauconite would soften if used alone. In this manner I secure a complete softening of the water, due to the rapid rate of base exchange of the glauconite, with a large softening capacity, due to slow rate of base exchange of the synthetic zeolite. Further, when the glauconite, used alone, approaches a state of exhaustion it loses its softening capacity very quickly and if this should take place when a large quantity of water was being drawn, as for instance a bath, the water would become very hard before the desired quantity had been drawn. The softening medium consisting of the two exchange base materials loses its softening capacity very slowly and where such a large quantity of water was being drawn the water might contain a few grains of hardness before the desired quantity had been drawn but this would be no greater than often passes for soft water. Thus the combined medium completely avoids the likelihood of the supply of soft water being suddenly exhausted. Because of the fact that the glauconite will be partially reconditioned by the zeolite giving up a portion of its base thereto there is no danger of the glauconite being completely exhausted or exhausted to such an extent that it will be difficult to recondition it.

The glauconite is heavier than the synthetic zeolite but, during the flow of water through the softener it will be mixed, more or less, with the synthetic zeolite. When the flow of water is interrupted the glauconite will settle to the bottom of the container, thus preventing the synthetic zeolite from coming in contact with the distributor heads and clogging the same.

It will be apparent, therefore, that with my improved softening medium, which can be provided at a relatively low cost, I am enabled to secure water of zero softness, delivered at a normal rate of flow, and to continue the production of completely softened water for a relatively long period of time, and, further, that the softening medium will not abruptly lose its softening capacity so as to suddenly interrupt the supply of soft water.

In addition to the foregoing the softening medium is capable of accomplishing another very important result. It will be obvious that the water may be softened by passing it in either direction through the softening medium. When the water is passed downwardly, first through the zeolite and then through the glauconite, the zeolite acts as a filter to remove solid from the water, and little, if any, of the solid matter reaches the lower bed. These solids may be removed by reversing the direction of flow of the water but some of the solid will adhere to the particles of zeolite and will not be removed by washing, thus gradually impairing the softening properties of the zeolite. When the flow of water is reversed to wash out the solids both materials will be agitated and lifted by the action of the water but when the flow of water has ceased the glauconite, because of its greater specific gravity, will settle to the bottom, and the zeolite will be supported upon the glauconite but will be separate therefrom. Inasmuch as the solids do not reach the glauconite, and the zeolite is not mixed with the glauconite, it will be apparent that the softening properties of the glauconite will not be impaired by the solids which are removed from the water but it will always be in condition to soften water, subject only to the usual periodic reconditioning. If the two materials were of the same specific gravity, or if one material only was used, the agitation thereof by the wash water would cause impaired portions of the filtering material to be mixed throughout the mass of material and as more and more of the material was impaired the whole mass would lose its softening properties and the apparatus would no longer soften water. With the arrangement here described the lower bed of material is always in condition to soften water and the upper bed of material will always filter solids from the water, even though it may have little or no softening capacity.

While I have shown the softening medium in connection with an upflow softener it will be understood that its operation is not dependent upon the direction of flow of the water or upon the particular arrangement of the materials here illustrated, and while I have shown one particular arrangement of the materials I do not wish to be limited thereto as various modifications both in the arrangement and in the materials themselves may occur to one skilled in the art.

Having now fully described my invention, what I claim as new and desire to secure by Letters Patent, is:

1. A water softening medium comprising two base exchange materials having different rates of base exchange which will tend to equalize the base conditions of the two materials, and so arranged with relation one to the other that the water to be softened will contact with both materials.

2. A water softening medium comprising two base exchange materials having different rates of base exchange which will tend to equalize the base conditions of the two materials, said materials being arranged in separate masses one above the other.

3. In a water softening apparatus, two beds of water softening material, the material of each bed having the property of exchanging its normal base for the substances which harden water and of again exchanging its base by giving up said substances and regaining its normal base, and the material of one of said beds having the property of exchanging its base more slowly than the material of the other of said beds will exchange its base, and being capable of giving up a portion of its normal base to said other material, and means for causing the water which is to be softened to pass through both beds of material.

4. In a water softening apparatus, two superimposed beds of water softening material, each material having the property of exchanging its normal base for the substances which harden water and of again exchanging its base by giving up said substances and regaining its normal base, said materials having different rates of base exchange and the material of the upper bed being capable of giving up a portion of its normal base to the material of the lower bed and thus tending to equalize the base conditions of the two materials, and means for causing the water which is to be softened to pass through both beds of material.

5. In a water softener, a bed of water softening material and a bed of granular material resting upon said bed of water softening material and having a specific gravity less than the specific gravity of said water softening material, so that said water softening material will normally settle below said granular material.

6. In a water softening apparatus, a bed of glauconite, a bed of synthetic zeolite, said glauconite having a greater specific gravity than said zeolite and tending normally to settle below the same, and means for passing water successively through said beds.

7. In a water softening apparatus, a bed of glauconite and a bed of synthetic zeolite resting upon said bed of glauconite and acting thereon to regenerate the same, and means for causing the water which is to be softened to pass through both beds of material.

In testimony whereof, I affix my signature hereto.

EDWARD T. TURNER.